(12) United States Patent
Lucke (10) Patent No.: US 11,681,309 B2
(45) Date of Patent: Jun. 20, 2023

(54) THERMAL MANAGEMENT SYSTEM AND METHOD

(71) Applicant: Westinghouse Air Brake Technologies Corporation, Wilmerding, PA (US)

(72) Inventor: Christopher A. Lucke, Plum, PA (US)

(73) Assignee: Westinghouse Air Brake Technologies Corporation, Wilmerding, PA (US)

( * ) Notice: Subject to any disclaimer, the term of this patent is extended or adjusted under 35 U.S.C. 154(b) by 203 days.

(21) Appl. No.: 16/697,250

(22) Filed: Nov. 27, 2019

(65) Prior Publication Data

US 2020/0218292 A1 Jul. 9, 2020

Related U.S. Application Data

(60) Provisional application No. 62/787,958, filed on Jan. 3, 2019.

(51) Int. Cl.
| | |
|---|---|
| *F28F 27/00* | (2006.01) |
| *F28F 27/02* | (2006.01) |
| *F28F 19/00* | (2006.01) |
| *F04B 39/06* | (2006.01) |
| *B60T 17/00* | (2006.01) |
| *G05D 23/02* | (2006.01) |
| *F01P 7/16* | (2006.01) |
| *B60T 17/22* | (2006.01) |

(52) U.S. Cl.
CPC ............ *G05D 23/027* (2013.01); *F01P 7/167* (2013.01); *B60T 17/228* (2013.01)

(58) Field of Classification Search
CPC .......... F28F 27/00; F28F 27/02; F28F 19/006; F28F 2265/14; G05D 23/00; G05D 23/1927; G05D 23/1931; B60T 17/002; B60T 17/006; F04B 39/06; F04B 39/066
USPC .......................................... 165/299, 300, 98
See application file for complete search history.

(56) References Cited

U.S. PATENT DOCUMENTS

| | | | |
|---|---|---|---|
| 5,507,154 A * | 4/1996 | Grant .................... | F25D 21/006 62/81 |
| 5,566,745 A * | 10/1996 | Hill ........................... | F01P 7/04 165/41 |
| 5,732,688 A * | 3/1998 | Charlton ................. | F02D 21/08 123/568.12 |
| 6,295,815 B1 * | 10/2001 | Bechle .................... | F02D 9/101 123/568.11 |
| 6,996,461 B2 | 2/2006 | Kane | |
| 7,236,860 B2 | 6/2007 | Kane | |

(Continued)

*Primary Examiner* — Frantz F Jules
*Assistant Examiner* — Jason N Thompson
(74) *Attorney, Agent, or Firm* — The Small Patent Law Group LLC; Mary D. Lawlor (57) ABSTRACT

A thermal management system and method includes a conduit assembly having a first conduit and a second conduit fluidly separate from the first conduit. The first conduit is fluidly coupled with and extends between a source of a first fluid and a destination for the first fluid. The second conduit directs a second fluid between an inlet and an outlet. The second fluid is configured to exchange heat with the first fluid within the conduit assembly. A control assembly includes one or more control elements that are configured to control an amount of the second fluid that is directed through the second conduit. One or more processors control operation of the control assembly based on one or more of a temperature of the first fluid or a temperature of the second fluid.

18 Claims, 4 Drawing Sheets

(56) References Cited

U.S. PATENT DOCUMENTS

| | | |
|---|---|---|
| 7,467,032 B2 | 12/2008 | Kane |
| 7,742,850 B2 | 6/2010 | Kane |
| 8,714,494 B2 | 5/2014 | Weber |
| 9,002,545 B2 | 4/2015 | Wilson |
| 9,168,936 B2 | 10/2015 | Grimm |
| 9,233,698 B2 | 1/2016 | Weber |
| 9,283,945 B1 | 3/2016 | Kemwein |
| 9,460,566 B2 | 10/2016 | Allwardt |
| 9,469,310 B2 | 10/2016 | Kernwein |
| 9,846,025 B2 | 12/2017 | Kirchner |
| 9,950,718 B2 | 4/2018 | Naylor |
| 10,077,033 B2 | 9/2018 | Oswald |
| 10,081,378 B2 | 9/2018 | Ruhland |
| 2003/0141050 A1* | 7/2003 | Brocksopp .......... F02B 29/0456 165/299 |
| 2007/0137590 A1* | 6/2007 | Vetrovec ................ F02B 37/00 123/25 A |
| 2009/0105920 A1 | 5/2009 | Fenske |
| 2009/0151794 A1* | 6/2009 | Achatz ................ F04B 39/066 137/334 |
| 2012/0068561 A1* | 3/2012 | Schwery .................. H02K 9/12 310/53 |
| 2012/0318163 A1* | 12/2012 | Ptacek ...................... F01P 1/06 188/158 |
| 2015/0233627 A1* | 8/2015 | Ragazzi .................. F25D 21/04 62/82 |
| 2015/0285264 A1* | 10/2015 | Kennedy .................. B61C 5/02 105/62.2 |
| 2015/0322934 A1* | 11/2015 | Hritz ..................... F04B 39/066 417/244 |
| 2015/0338858 A1* | 11/2015 | Bates .................. B60H 1/3232 62/56 |
| 2016/0075212 A1* | 3/2016 | Morishita .......... B60H 1/00899 165/41 |
| 2016/0075356 A1 | 3/2016 | Kull |
| 2016/0209099 A1* | 7/2016 | Liu ...................... F25B 49/025 |
| 2016/0311420 A1* | 10/2016 | Assmann ............... B61H 13/34 |
| 2016/0332504 A1* | 11/2016 | Blatchley ................ F25B 49/02 |
| 2017/0043797 A1 | 2/2017 | Allshouse |
| 2018/0009289 A1* | 1/2018 | Grossman .......... B60H 1/00742 |
| 2018/0087851 A1* | 3/2018 | Mackin ................ F16K 31/004 |

\* cited by examiner

THERMAL MANAGEMENT SYSTEM AND METHOD

CROSS-REFERENCE TO RELATED APPLICATIONS

This application claims priority to U.S. Provisional Patent Application No. filed 62/787,958 filed 3Jan. 2019, hereby incorporated by reference herein in its entirety.

BACKGROUND

Technical Field

The subject matter described relates to thermal management systems and methods.

Discussion of Art

Single stage compressors include a driving mechanism for compressing air contained within a compression chamber, such as a piston and cylinder arrangement, or a centrifugal, axial-flow, or turbine-type mechanism. Multiple stage compressors may be utilized to compress gasses to pressures that are higher than can normally be achieved with a single stage compressor. Multiple stage compressors may include plural single stage compressors connected to each other in series, such that compressed gas is passed from one stage to the next. The pressure of the gas increases at each succeeding stage. Multiple stage compressors often include an additional cooling step, referred to as an air cooler, to cool compressed gas discharged from the final compression stage.

However, in ambient conditions that may be close to or below freezing, the compressed gas discharged from the final compression stage may freeze downstream of the final compressor. Additionally, water condensation may freeze within the air cooler or before the water condensation is removed from the compressor. Airline freeze can block the compressed gas from exiting the compressor, from one or more systems fluidly coupled with and downstream from the compressor (e.g., a brake system, or the like), and render the compressor unusable.

Additionally, in ambient temperatures that are above freezing, mechanisms that may block or reduce an amount of airflow across the air cooler may prohibit cool ambient air from traveling across the air cooler, thus resulting in discharge air having a temperature that is higher than normal discharge air from the compressor.

BRIEF DESCRIPTION

In one or more embodiments, a thermal management system includes a conduit assembly having a first conduit and a second conduit fluidly separate from the first conduit. The first conduit is fluidly coupled with and extends between a source of a first fluid and a destination for the first fluid. The second conduit directs a second fluid between an inlet and an outlet. The second fluid is configured to exchange heat with the first fluid within the conduit assembly. A control assembly includes one or more control elements that are configured to control an amount of the second fluid that is directed through the second conduit. One or more processors control operation of the control assembly based on one or more of a temperature of the first fluid or a temperature of the second fluid.

In one or more embodiments, a system includes a conduit assembly having a first conduit and a second conduit fluidly separate from the first conduit. The first conduit is fluidly coupled with and extends between a source of a first fluid and a destination for the first fluid. The second conduit directs a second fluid between an inlet and an outlet. The second fluid is configured to exchange heat with the first fluid. A control assembly includes one or more adjustable openings configured to change between plural positions to control an amount of the second fluid that is directed through the second conduit. One or more processors control operation of the control assembly based on one or more of a temperature of the first fluid or a temperature of a second fluid.

In one or more embodiments, a method includes controlling operation of a control assembly to control an amount of a second fluid that is directed through a second conduit of a conduit assembly. The conduit assembly includes a first conduit and the second conduit that is fluidly separate from the first conduit. The first conduit is fluidly coupled with and extends between a source of a first fluid and a destination for the first fluid. The second conduit directs the second fluid between an inlet and an outlet. The second fluid is configured to exchange heat with the first fluid within the conduit assembly. Controlling operation of the control assembly is based on one or more of a temperature of the first fluid or a temperature of the second fluid.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to thermal management systems and methods. The thermal management systems may be disposed onboard a vehicle system that moves along a route. The thermal management system may include a conduit assembly having a first conduit and a second conduit that is fluidly separate from the first conduit. A first fluid moves within the first conduit, and a second fluid moves within the second conduit. The first and second fluids exchange thermal energy within the conduit assembly. A control assembly having one or more control elements controls an amount of the second fluid that is directed through the second conduit. Operation of the control assembly may be based on a temperature of the first fluid, a temperature of the second fluid, and/or a temperature differential between the first and second fluids.

As one example, the first conduit may be a conduit that directs compressed gas from a first stage compressor to a second stage compressor. A temperature sensor may monitor, sense, or otherwise detect the temperature of the compressed gas within the first conduit. The second fluid may be ambient air outside of the vehicle system. The differential between the ambient air outside the vehicle system and the compressed gas within the first conduit may be accomplished, or otherwise controlled, by regulating an amount of airflow of the ambient air across the first conduit comprising the compressed gas. The ambient air may change the temperature of the compressed gas. One or more control elements, such as adjustable openings, blowers, fans, or the like, may control an amount of the ambient air that may be directed within the second conduit to exchange heat with the compressed gas within the first conduit based on the temperature of the compressed gas, the temperature of the ambient air, or a differential between the temperature of the compressed gas and the temperature of the ambient air.

While some embodiments described herein relate to rail vehicle systems or positive train control systems, not all embodiments of the inventive subject matter are restricted to rail vehicles or positive train control systems. One or more embodiments of the inventive subject matter may relate to other types or models of vehicle systems, such as automobiles, trucks, buses, mining vehicles, marine vessels, aircraft (manned or unmanned, such as drones), agricultural vehicles, or other off-highway vehicles. One or more embodiments may relate to control systems that control operation of vehicles other than positive train control systems.

Figure 1:
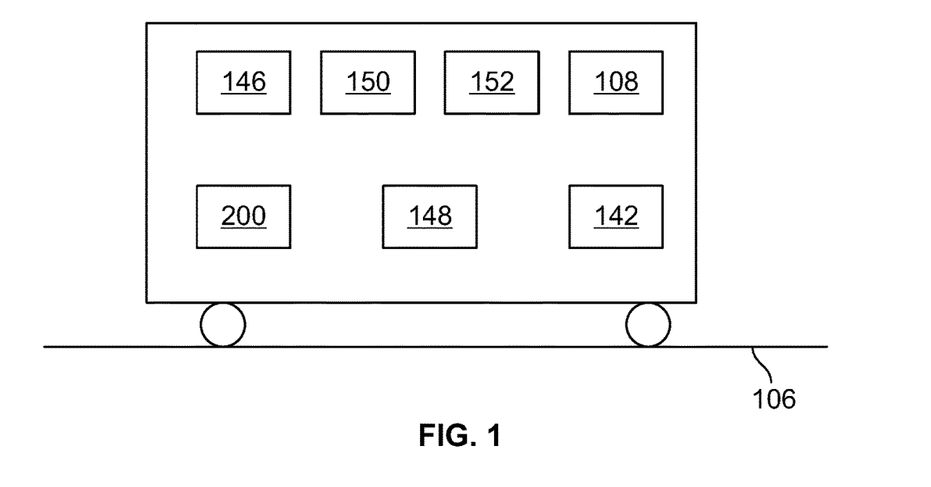
FIG. 1 schematically illustrates one example of a vehicle system.

FIG. 1 schematically illustrates one example of a vehicle system 100. The vehicle system 100 can be a rail vehicle system, but optionally can be automobiles, trucks, buses, mining vehicles, marine vessels, aircraft, agricultural vehicles, or other off-highway vehicles. The illustrated vehicle system includes a single vehicle, but optionally can be formed from two or more vehicles that may travel together (by being mechanically coupled or by being mechanically separate by communicating with each other to travel together, such as in a convoy). In one or more embodiments, the vehicle system may include two or more different kinds of vehicles that may travel together, such as a rail vehicle and an aerial vehicle, or a marine vessel and an unmanned aerial drone, or the like. The vehicle system travels along a route 106, such as tracks, roads, highways, land-based paths, airborne paths, waterways, or the like.

The vehicle system 100 can include a controller 108 that can represent hardware circuitry that includes and/or is connected with one or more processors that perform operations of the vehicle system or one or more systems of the vehicle system 100. The vehicle system 100 may include a communication device 142 that communicates with one or more other vehicles of the vehicle system, with a wayside device, with an off-board database or an off-board control center, or the like. The communication device may include the same or similar components as other communication devices described herein. A memory 146 of the vehicle system 100 can store information about the vehicle system, information about the route along which the vehicle system travels, information about a transportation network including intersecting routes, information about other vehicle systems that may travel within the transportation network, or the like.

The vehicle system includes a propulsion system 150 that operates to move the vehicle system along the route. The propulsion system can represent one or more engines, motors, transmissions, propellers, or the like, that generate propulsion to move the vehicle system. The vehicle system also can include a brake system 152 that operates to slow or stop movement of the vehicle system. The brake system can include air brakes, friction brakes, motors (e.g., used for dynamic or regenerative braking), or the like. The controller can communicate control signals with the propulsion system and/or the brake system to control or change movement of the vehicle system. In one or more embodiments, the brake system and/or the propulsion system may extend between two or more vehicles of the vehicle system. For example, the brake system may include air brakes that includes cylinders that extend between two or more vehicles that may operate in unison to slow or stop movement of one or more vehicles of the vehicle system.

The vehicle system 100 may include a sensor system 148 having one or more sensors disposed onboard the vehicle system. In one or more embodiments, a sensor may be disposed onboard each of the vehicles of the vehicle system. Each of the sensors of the sensor system may communicate with each other via communication devices onboard one or more vehicles of the vehicle system, may communicate with an off-board database or center, a wayside device, or the like. Optionally, the sensor onboard the vehicle system may communicate with sensors off-board the vehicle system. The sensors can measure one or more characteristics of the vehicle system. For example, the sensor may sense, measure, or otherwise detect temperatures of the different fluids of the vehicle system, ambient temperatures outside of or off-board the vehicle system, one or more characteristics of the propulsion system and/or the brake system of one or more vehicles of the vehicle system, or the like.

The controller can also control one or more settings or operations of the sensors. The controller may direct different sensors to sense at one or more different times, for different lengths of time (e.g., intermittently, continuously, or the like). Optionally, the sensor may be an optical sensor, and the controller may control a direction the optical sensor faces and/or orientation of the optical sensor to capture images and/or video of different components of the vehicle system, different segments of the route, or the like. Optionally, the sensor may be an infrared sensor, and the controller may control a direction the infrared sensor faces, a length of time the infrared sensor operates, or the like.

The vehicle system 100 also includes a thermal management system 200 that may operate to control a temperature of one or more fluids that may be used to operate the vehicle system. For example, the thermal management system may include one or more compressors and one or more fluid reservoirs that may be fluidly coupled with each other. Compressed gas may move throughout the vehicle system via one or more conduits of the thermal management system. In one or more embodiments, the thermal management system may extend between two or more vehicles of the vehicle system.

Figure 2:
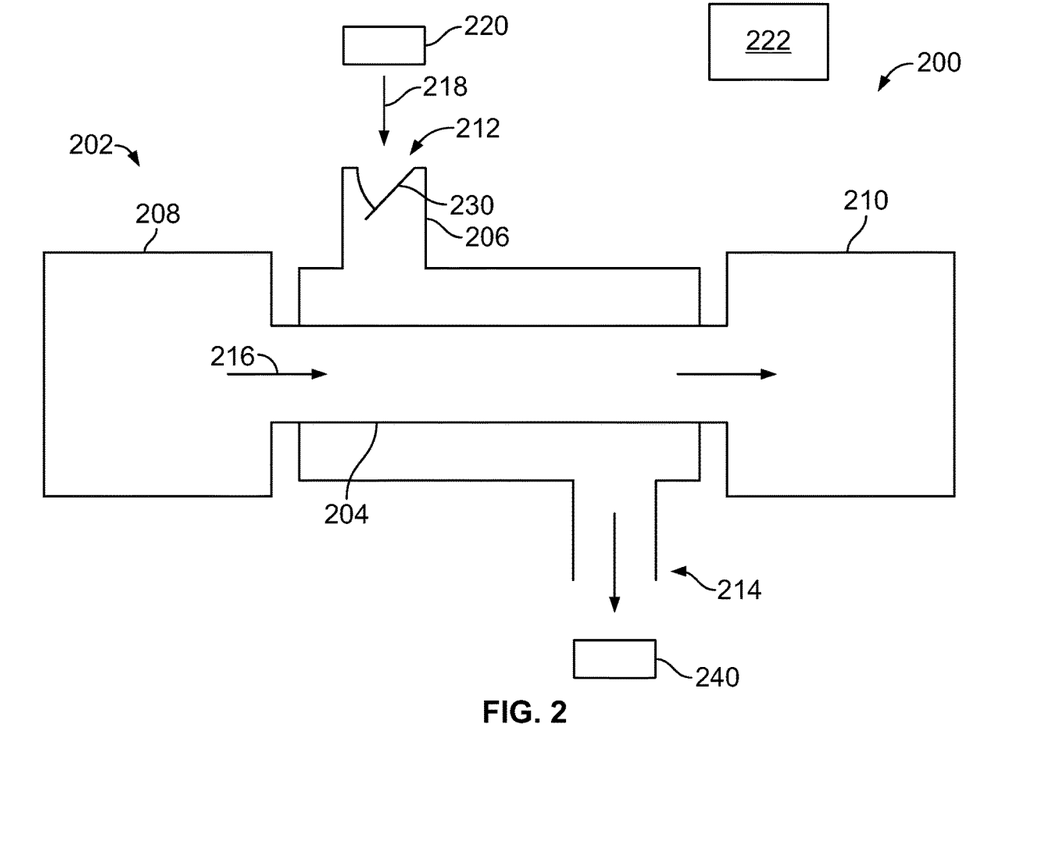
FIG. 2 schematically illustrates one example of a thermal management system in accordance with one embodiment.

FIG. 2 illustrates a schematic example of the thermal management system. In one or more embodiments, the thermal management system is a cooling system. The thermal management system includes a conduit assembly 202 having a first conduit 204 and a second conduit 206. In the illustrated embodiment, the first and second conduits are fluidly separate from each other. A first fluid 216 moves from a source 208 toward a destination 210 via the first conduit, and a second fluid 218 moves from an inlet 212 toward an outlet 214 via the second conduit. In the illustrated embodiment of FIG. 2, the second conduit is a jacket that extends around at least a portion of the first conduit. For example, the jacket of the second conduit directs the second fluid toward and around the first fluid such that the first fluid and the second fluid exchange thermal energy (e.g., heat) within the thermal management system.

The thermal management system may include a control assembly 222 that controls one or more control elements of the thermal management system. In one or more embodiments, the control assembly may be controlled by the controller of the vehicle system (illustrated in FIG. 1), by a controller off-board the vehicle system, such as a controller of an off-board database, a back-office server, or the like. As one example, an operator of the off-board database may remotely control operation of the control assembly. Optionally, the operator of the off-board database may direct an operator onboard the vehicle system to manually change one or more settings of the control assembly and/or the controller to control operation of the control assembly, the thermal management system, or the like.

In one or more embodiments, the control assembly may include one or more control elements such as a blower 220, one or more adjustable openings 230, a fan 240, or any combination of two or more therein. The control elements control an amount of the second fluid that is directed through the second conduit. As one example, the control assembly includes the blower that is disposed outside of the inlet of the second conduit and blows or pushes the second fluid from the inlet of the second conduit toward the outlet of the second conduit. As another example, the control assembly includes one or more adjustable openings that may open and/or close to different positions to control an amount of the second fluid that is directed into the second conduit. In the illustrated embodiment of FIG. 2, the control assembly includes a single adjustable opening that is disposed at the inlet of the second conduit. Optionally, one or more adjustable openings may be disposed at the inlet, the outlet, may be aligned in series and/or parallel relative to each other in a direction of movement of the second fluid, or the like. As another example, the control assembly may include the fan that is disposed outside of the outlet of the second conduit and pulls the second fluid from the inlet toward the outlet.

As another example, the control assembly may include a blower or fan that may direct another fluid within the thermal management system to exchange heat with the first fluid and/or the second fluid. Optionally, the thermal management system may include any alternative control elements that may control an amount of first fluid that moves within the thermal management system, controls an amount of the second fluid that moves within the thermal management system, and/or controls an amount of another fluid that may be directed within and/or around the thermal management system to control a temperature of the thermal management system. The controller (shown in FIG. 1) may control operation of the control assembly based on a temperature of the first fluid, a temperature of the second fluid, a temperature differential between the first and second fluids, or the like.

Figure 3:
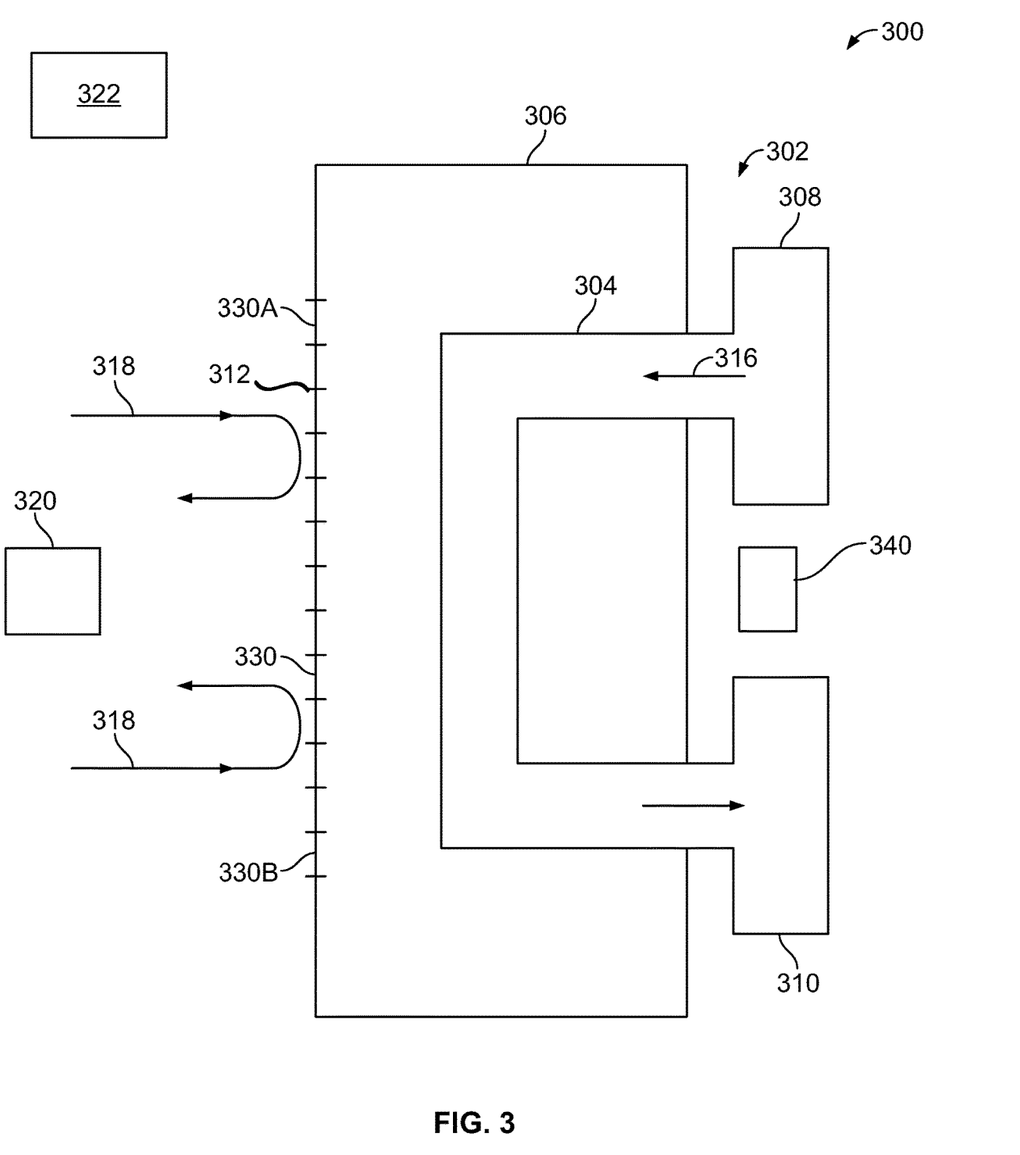
FIG. 3 schematically illustrates one example of a thermal management system of the vehicle system shown in FIG. 1.

FIG. 3 illustrates one example of a thermal management system 300. As one example, the thermal management system may be disposed onboard the vehicle system shown in FIG. 1. A first fluid 316 may be directed from a source 308 toward a destination 310 via a first conduit 304. As one example, the vehicle system may include a two-stage air compressor, and compressed gas (e.g., air) may be directed into the first conduit via the source, a temperature of the compressed gas may be reduced by the thermal management system, and the compressed gas having a reduced temperature may be directed toward the destination. The reduced temperature may be directed toward a compressor, a reservoir, or any alternative system of the vehicle system.

A second fluid 318 may be directed toward a second conduit 306 via an inlet 312. In the illustrated embodiment of FIG. 3, the first conduit is disposed within the second conduit such that the second conduit may be a jacket that may extend around at least a portion of the first conduit. Optionally, the first conduit may be disposed outside of the second conduit, but may be proximate to the second conduit to promote the exchange of thermal energy between the first and second fluids. Additionally, the first fluid is fluidly separate from the second fluid. For example, the first and second fluids move within the first and second conduits, respectively, and do not fluidly couple with each other within the thermal management system. In one or more embodiment, the thermal management system may be referred to as an air-to-air charge cooler, such that a temperature of the first fluid may be controlled by a temperature of the second fluid.

In one or more embodiments, one or more temperature sensors (e.g., one of the sensors of the sensor system 148) may be operably coupled with the first conduit and/or the second conduit to measure the temperature of the first fluid and/or the second fluid. Optionally, one or more of the temperature sensors may be disposed outside of the conduit assembly, at one or more positions inside the conduit assembly, or the like. Optionally, a single temperature sensor may measure, detect, or otherwise sense the temperature of the first and second fluids, and may communicate the sensed temperatures with the one or more processors of the controller, where a temperature differential may be determined.

A control assembly 322 controls one or more control elements of the thermal management system to control an amount of the second fluid that is directed through the second conduit. As one example, one of the control elements may be a blower 320 that may blow or push the second fluid toward the inlet of the second conduit. Additionally or alternatively, one or more of the control elements may be a fan 340 that may pull the second fluid toward the inlet of the second conduit. As another example, the fan may be used to change a temperature of the first fluid. For example, the fan may be setup to control a temperature of the thermal management system, and may or may not be used to control an amount of the second fluid that is directed into the second conduit.

Optionally, one or more of the control elements may be one or more adjustable openings 330. The adjustable openings change between plural positions to control the amount of the second fluid that id directed through the second conduit. In the illustrated embodiment of FIG. 3, each of the adjustable openings are in a fully closed position. For example, the second fluid moves in a direction toward the adjustable openings, but the adjustable openings in the closed position prohibits the second fluid from moving through the second conduit.

Figure 4:
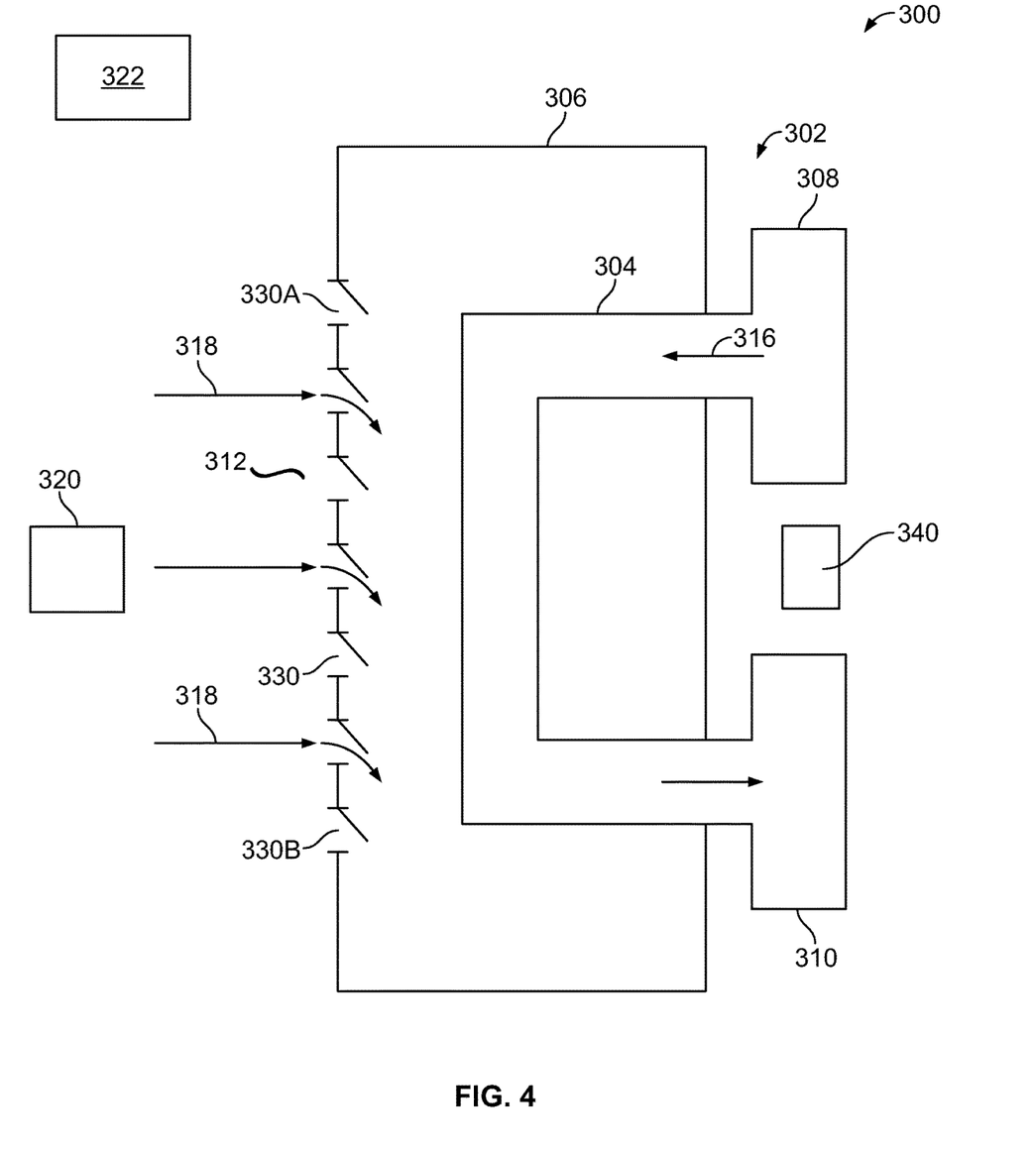
FIG. 4 schematically illustrates one example of a thermal management system of the vehicle system shown in FIG. 1.

Optionally, FIG. 4 schematically illustrates one example of the thermal management system where the adjustable openings are in a fully open position. For example, the adjustable openings in the fully open position allows the second fluid to move through the second conduit. In one or more embodiments, a first adjustable opening 330A may be in an open position, and a second adjustable opening 330B may be in another position (e.g., fully open, fully closed, partially open to a different opening size than the first adjustable opening, or the like). For example, each of the adjustable openings may be individually controlled to change position of each of the adjustable openings to different positions between and including a fully open position and a fully closed position. The adjustable openings having a fully open position increases an amount of the second fluid that is directed into and through the second conduit. Additionally, the adjustable openings having a fully closed position decreases an amount of the second fluid that is directed into and through the second conduit.

In the illustrated embodiment of FIG. 4, the adjustable openings are shown as pivoting doors, or the like, that may open and/or shut about hinges to plural positions between the fully open and fully closed positions. Optionally, the adjustable openings may be slats or slots, and a sliding mechanism (e.g., a sliding plate, or the like), may be moved to control a size of the openings of each of the slats or slots. Optionally, the adjustable openings may be substantially circular in shape, and the openings may be opened or closed to different positions by changing the size of the circular shape of each of the adjustable openings. Optionally, the adjustable openings may have any alternative orientation and/or configuration, and may be controlled to individually or uniformly change the size of each of the adjustable openings to control an amount of the second fluid that may be directed into the second conduit.

The position of each of the adjustable openings may be changed automatically by the control assembly. For example, operation of the controller 108 may control operation of the control assembly to change the positions of one or more of the adjustable openings. Optionally, the position of each of the adjustable openings may be changed manually by an operator of the vehicle system.

The position of each of the adjustable openings, an operational setting of the blower, and/or an operational setting of the fan may be controlled based on a temperature of the first fluid, a temperature of the second fluid, and/or a temperature differential between the first and second fluids, the temperature of the first fluid being greater than or less than a predetermined threshold, the temperature of the second fluid being greater than or less than a predetermined threshold, or any combination or two or more therein.

Optionally, the position of each of the adjustable openings, an operational setting of the blower, and/or an operational setting of the fan may be based on ambient environmental factors outside of the thermal management system. For example, the operation of the blower, the fan, and the position of each of the adjustable openings may change based on an ambient temperature, ambient humidity level, based on an elevation level, based on one or more environmental factors such as air quality, or the like. Optionally, The position of each of the adjustable openings and/or the operational settings of the blower and/or the fan may be based on one or more characteristics of the vehicle system, such as a speed at which the vehicle system is moving (e.g., a throttle setting and/or brake setting), a health or state of the vehicle system, or the like.

As one example, the first fluid may be compressed gas that is directed into the thermal management system to reduce a temperature of the compressed gas. Additionally, the second fluid may be another gas, such as ambient air. For example, the vehicle system may be operating within a cold-weather environment such that a temperature of the ambient air is less than a predetermined threshold. The controller may change position of one or more of the adjustable openings to reduce an amount of the ambient air that is directed into the second conduit from a position outside of the thermal management system (e.g., outside of the vehicle system) based on a temperature of the ambient air (e.g., the second fluid) being less than a predetermined threshold, based on a temperature of the compressed gas (e.g., the first fluid) being greater than a predetermined threshold, based on a temperature differential between the compressed gas and the ambient air being greater than a predetermined threshold, or the like. For example, the temperature of the ambient air may cause the first fluid to freeze, or reduce to a temperature that is below a predetermined threshold or a predetermined minimum temperature of the compressed gas.

As another example, the vehicle system may be operating within a warm-weather environment such that a temperature of the ambient air is greater than a predetermined threshold. The controller may change position of one or more of the adjustable openings to increase an amount of the ambient air that is directed into the second conduit from a position outside of the thermal management system (e.g., outside of the vehicle system) based on a temperature of the ambient air (e.g., the second fluid) being greater than a predetermined threshold, based on a temperature of the compressed gas (e.g., the first fluid) being greater than a predetermined threshold, based on a temperature differential between the compressed gas and the ambient air being greater than a predetermined threshold, or the like.

Additionally or alternatively, the controller may change an operational setting of the blower and/or the fan based on a temperature of the ambient air (e.g., the second fluid) being greater than or less than a predetermined threshold, based on a temperature of the compressed gas (e.g., the first fluid) being greater than or less than a predetermined threshold, or a temperature differential between the compressed gas and the ambient air being greater than or less than a predetermined threshold.

Figure 5:
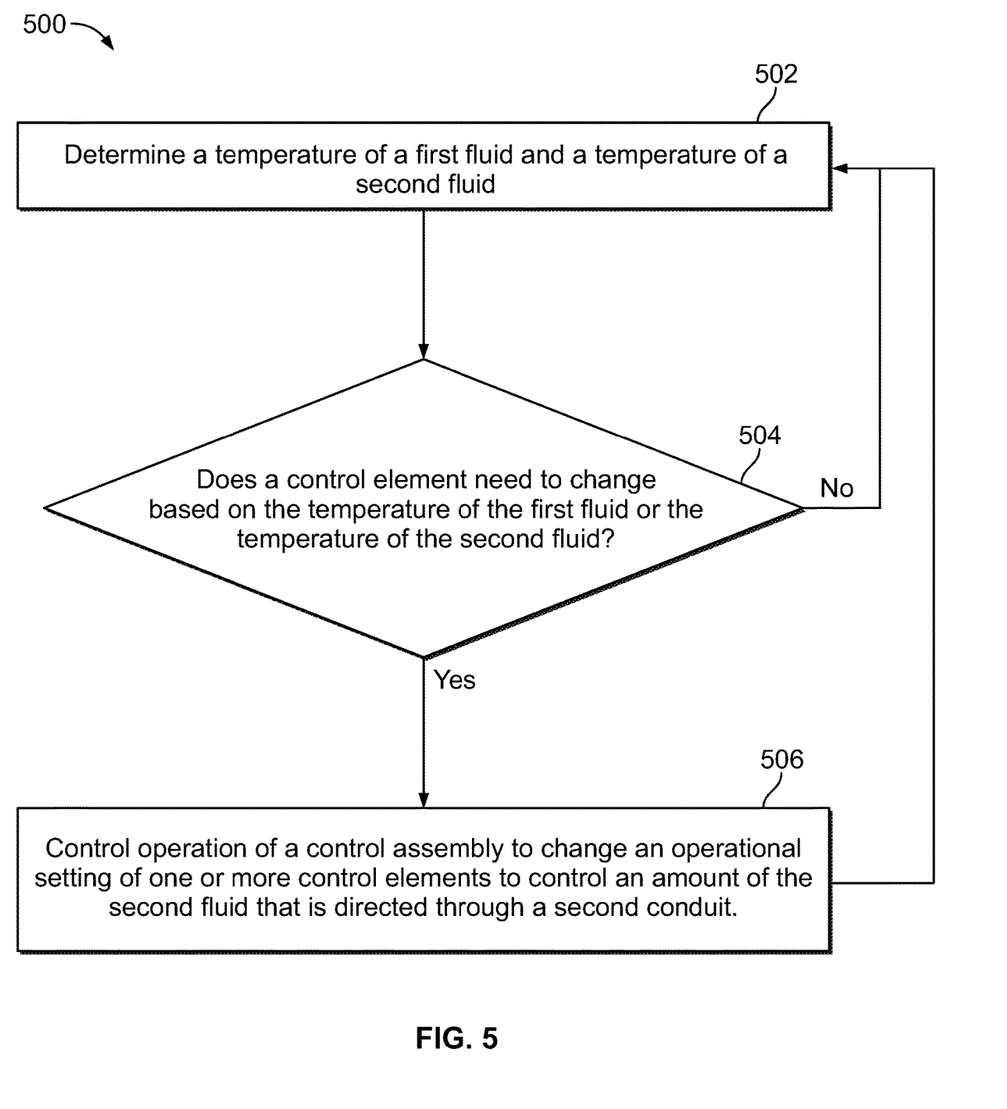
FIG. 5 illustrates a flowchart of one example of a method for operating a thermal management system in accordance with one embodiment.

FIG. 5 illustrates a flowchart of one example of a method 500 for operating a thermal management system. At 502, a temperature of a first fluid and a temperature of a second fluid are determined. One or more sensors of a sensor system may detect, measure, or otherwise sense the temperatures of the first and second fluids, and may communicate sensor signals with one or more processors of a controller. The controller may determine the temperatures of the first and second fluids, and may determine the temperatures differential between the temperatures of the first and second fluids.

The first fluid may move within a first conduit of a conduit assembly, and the second fluid may move within a second conduit of a conduit assembly. The first and second fluids are fluidly separate from each other. In one or more embodiments, the first conduit may be disposed within the second conduit, may be partially disposed within the second conduit, may be disposed outside of the second conduit, or the like. In one or more embodiments, the first fluid may be compressed gas, and the second fluid may be ambient air, other compressed gas, another gas, or the like. The first fluid may exchange heat with the second fluid within the conduit assembly of a thermal management system.

At 504, a determination is made if a control element needs to be changed based on the temperature of the first fluid, or the temperature of the second fluid. Optionally, the control element may need to be changed based on a temperature differential of the first and second fluids. The thermal management system may include a control assembly having one or more control elements that control an amount of the second fluid that is directed through the second conduit. If the control element does not need to be changed, then flow of the method returns to 502, and the method repeats. Alternatively, if the control element does need to be changed, then flow of the method proceeds toward 506.

At 506, operation of the control assembly is controlled by one or more processors based on the temperature of the first fluid, the temperature of the second fluid, and/or a temperature differential between the first and second fluids. For example, operational settings of one or more control elements may be changed to control an amount of the second fluid that is directed through the second conduit. As one example, an operator onboard may manually manipulate an input device to change operational settings of one or more control elements (e.g., change a setting of an electronic motor and/or drive unit, operate a pneumatic device, or the like). Optionally, the one or more processors may automatically change one or more of the control elements to control an amount of the second fluid that is directed through the second conduit. For example, the one or more processors may change the settings of the control elements based on one or more predetermined rules or the like. Optionally, an operator off-board the system may manually change the settings of the control elements based on the temperatures of the first and/or second fluids.

In one embodiment, the control element may be one or more adjustable openings. The adjustable openings may be opened and/or closed to different positions to control an amount of the second fluid that is directed through the second conduit. In one or more embodiments, each of the adjustable openings may be opened and/or closed to positions that are unique and/or uniform relative to the positions of each other adjustable opening.

In one or more embodiments, the control element may be a blower and/or fan that may be disposed outside of the second conduit that blows or pushes the second fluid toward the second conduit. In another embodiment, the control element may be a blower or fan that is disposed inside the second conduit that pulls the second fluid toward the second conduit. Additionally or alternatively, the blower or fan inside the second conduit may be operated to reduce a temperature of the first fluid. For example, the blower or fan may be operated to change movement of airflow around the first conduit to control a temperature of the first fluid.

In one or more embodiments, the thermal management system may include one or more adjustable openings, a blower or fan that blows or pushes the second fluid toward the second conduit, and a blower or fan that pulls the second fluid toward the second conduit and pushes ambient air around the first conduit. Optionally, the thermal management system may include any alternative control element that may control an amount of the second fluid that is directed through the second conduit.

The control elements may be automatically controlled by the one or more processors of the controller, automatically by a controller off-board the vehicle system, manually by an operator onboard the vehicle system, or the like.

In one or more embodiments, the vehicle system may communicate a signal to an off-board database, such as a back-office server of a positive train control system, or to other vehicle systems. The signal may include or indicate a location where the vehicle system is traveling, an identification of the vehicle system, operational settings of the vehicle system, environmental parameters particular to the location of the vehicle system (e.g., time of day, temperature, humidity, precipitation, air quality, or the like), and operational settings of the control elements of the thermal management system. The signal may be communicated as a movement authority, or a bulletin. As one example, the back-office server may communicate a response signal to the vehicle system directing the vehicle system to change an operational setting of the vehicle system, or an operational setting of the control assembly based on the signal communicated by the vehicle system. Optionally, the response signal may automatically remotely change an operational setting of the vehicle system. Optionally, the response signal may include an alert or warning to the operator onboard the vehicle system, a direction to the operator to manually change an operational setting of the vehicle system, or the like. Additionally or alternatively, the back-office server may communicate a movement authority or bulletin to another vehicle system based on the information provided by the vehicle system.

With respect to a positive train control system, the vehicle system may include onboard components that communicate with the positive train control system. These components may limit movement of the vehicle systems based on movement authorities, bulletins, etc., that are issued by the back-office server of the positive train control system. Different back-office servers may be associated with different areas in which the movement authorities, bulletins, etc. are issued. For example, each back-office server of several back office servers may issue movement authorities, bulletins, or the like, for the vehicle systems traveling in an area associated with that back-office server, but not for the vehicle systems traveling in an area associated with another back-office server. For example, the controller onboard the vehicle system (shown in FIG. 1) may automatically communicate with a first back-office server (e.g., a first off-board database) when the vehicle system is in a first location, and the controller may automatically communicate with a second back office server (e.g., a second off-board database) when the vehicle system is in a different location, such as a different city, county, state, or the like.

Communication with different back office servers may require onboard components of the vehicle system to have different versions of software, different communication protocols, or the like. A vehicle system having a software version or communication protocol that can communicate with the back-office server associated with route segments in one area may not be the correct version or protocol for communicating with another back office server associated with route segments in another area. The vehicle system may need to update or change the software version or communication protocol before entering into and/or traveling within the other area.

As one example, the controller of the vehicle system may wirelessly communicate with onboard components of the vehicle system to determine the version of software running onboard the vehicle system (that communicates with the off-board controller). As another example, the onboard controller can communicate with onboard components of the vehicle system to determine the communication protocol used by the onboard components to communicate with the off-board controller. As another example, the onboard controller can communicate with onboard components of the vehicle system to determine the contents of a database (e.g., memory) onboard the vehicle system. The onboard controller can determine whether any of these characteristics indicates that the vehicle system is able to communicate with a back office server (e.g., the off-board controller) or with a traffic control device, or whether a software version change, a change in communication protocol, and/or a modification of the information stored onboard the vehicle system is needed before the vehicle system can communicate with the off-board controller.

If the onboard controller determines that a change in software, communication protocol, and/or database is needed, then the onboard controller can direct the communication device to communicate a sensor signal to the vehicle system and/or the back-office server. This sensor signal can include the software change, communication protocol change, and/or database change, or can direct the vehicle system to obtain the software, protocol, and/or database change. This can ensure that the vehicle system has the correct or proper software version, communication protocol, and/or database content for entering into and/or traveling within an area associated with a back-office server of a positive train control system.

In one or more embodiments of the subject matter described herein, a thermal management system includes a conduit assembly having a first conduit and a second conduit fluidly separate from the first conduit. The first conduit is fluidly coupled with and extends between a source of a first fluid and a destination for the first fluid. The second conduit directs a second fluid between an inlet and an outlet. The second fluid is configured to exchange heat with the first fluid within the conduit assembly. A control assembly includes one or more control elements that are configured to control an amount of the second fluid that is directed through the second conduit. One or more processors control operation of the control assembly based on one or more of a temperature of the first fluid or a temperature of the second fluid.

Optionally, the one or more control elements may include one or more adjustable openings configured to change between plural positions to control the amount of the second fluid that is directed through the second conduit.

Optionally, the plural positions includes a fully open position and a fully closed position. The one or more adjustable openings in the fully open position increased the amount of the second fluid that is directed through the second conduit, and the one or more adjustable openings in the fully closed position decreases the amount of the second fluid that is directed through the second conduit.

Optionally, the one or more processors control a first adjustable opening of the one or more adjustable openings to a first position of the plural positions, and the one or more processors control a second adjustable opening of the one or more adjustable openings to a second position of the plural positions.

Optionally, the one or more control elements may include a blower that may control the amount of the second fluid that is directed through the second conduit.

Optionally, the one or more control elements may include a blower and one or more adjustable openings to control the amount of the second fluid that is directed through the second conduit.

Optionally, the one or more processors may control operation of the control assembly to reduce the amount of the second fluid that is directed through the second conduit based on the temperature of the first fluid being less than a predetermined threshold.

Optionally, the one or more processors may control operation of the control assembly to increase the amount of the second fluid that is directed through the second conduit based on the temperature of the first fluid being greater than a predetermined threshold.

Optionally, the thermal management system may include a sensor system operably coupled with the one or more processors. The sensor system may measure a temperature differential between the first fluid and the second fluid. The one or more processors may control operation of the control assembly to control the amount of the second fluid that is directed through the second conduit based at least in part on the temperature differential.

Optionally the first conduit may be disposed within the second conduit.

In one or more embodiments of the subject matter described herein, a system includes a conduit assembly having a first conduit and a second conduit fluidly separate from the first conduit. The first conduit is fluidly coupled with and extends between a source of a first fluid and a destination for the first fluid. The second conduit directs a second fluid between an inlet and an outlet. The second fluid is configured to exchange heat with the first fluid. A control assembly includes one or more adjustable openings configured to change between plural positions to control an amount of the second fluid that is directed through the second conduit. One or more processors control operation of the control assembly based on one or more of a temperature of the first fluid or a temperature of a second fluid.

Optionally, the control assembly may include a blower that may control the amount of the second fluid that is directed through the second conduit.

Optionally, the one or more processors may control operation of the control assembly to reduce the amount of the second fluid that is directed through the second conduit based on the temperature of the first fluid being less than a predetermined threshold.

Optionally, the one or more processors may control operation of the control assembly to increase the amount of the second fluid that is directed through the second conduit based on the temperature of the first fluid being greater than a predetermined threshold.

Optionally, the system may include a sensor system operably coupled with the one or more processors. The sensor system may measure a temperature differential between the first fluid and the second fluid. The one or more processors may control operation of the control assembly to control the amount of the second fluid that is directed through the second conduit based at least in part on the temperature differential.

In one or more embodiments of the subject matter described herein, a method includes controlling operation of a control assembly to control an amount of a second fluid that is directed through a second conduit of a conduit assembly. The conduit assembly includes a first conduit and the second conduit that is fluidly separate from the first conduit. The first conduit is fluidly coupled with and extends between a source of a first fluid and a destination for the first fluid. The second conduit directs the second fluid between an inlet and an outlet. The second fluid is configured to exchange heat with the first fluid within the conduit assembly. Controlling operation of the control assembly is based on one or more of a temperature of the first fluid or a temperature of the second fluid.

Optionally, controlling operation of the control assembly may include changing one or more adjustable openings between plural positions to control the amount of the second fluid that is directed through the second conduit of the conduit assembly.

Optionally, controlling operation of the control assembly may include reducing the amount of the second fluid that is directed through the second conduit based on the temperature of the first fluid being less than a predetermined threshold.

Optionally, controlling operation of the control assembly may include increasing the amount of the second fluid that is directed through the second conduit based on the temperature of the first fluid being greater than a predetermined threshold.

Optionally, the method may include measuring a temperature differential between the first fluid and the second fluid, and controlling operation of the control assembly to control the amount of the second fluid that is directed through the second conduit based at least in part on the temperature differential.

As used herein, the terms "processor" and "computer," and related terms, e.g., "processing device," "computing device," and "controller" may be not limited to just those integrated circuits referred to as a computer, but refer to a microcontroller, a microcomputer, a programmable logic controller (PLC), field programmable gate array, and application specific integrated circuit, and other programmable circuits and vice versa. Collectively, these processors are referred to as a controller herein. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A thermal management system comprising:
   a conduit assembly configured to be operably coupled with a vehicle system that is configured to move between plural geographic locations having different temperatures of ambient air, the conduit assembly comprising a first conduit and a second conduit fluidly separate from the first conduit, the first conduit configured to be fluidly coupled with and extend between a source of a first fluid and a destination for the first fluid, that is different than the source of the first fluid, the second conduit configured to be fluidly coupled with an area outside of the vehicle system via plural inlets configured to direct ambient air into the second conduit, the ambient air configured to exchange thermal energy with the first fluid within the conduit assembly;
   a control assembly comprising plural control elements disposed at a location that is upstream of the first conduit, wherein the plural control elements are configured to control and amount of the ambient air that is directed through the second conduit, the plural control elements operably coupled with an exterior surface of the vehicle system; and
   one or more processors configured to determine a temperature differential between a sensed temperature of the ambient air and temperature of the first fluid, wherein the one or more processors are configured to remotely control operation of the control assemble to change between plural settings based on the temperature differential, wherein a first setting of the control assembly is based on the temperature differential exceeding a predetermined threshold, and a second setting of the control assembly is based on the temperature differential being less than the predetermined threshold;
   wherein the one or more processors are configured to control operation of the control assembly to change the setting of the control assembly responsive to one or more of the vehicle system moving to a different geographic location or a change of the temperature differential between the temperature of the ambient air and the temperature of the first fluid.

2. The thermal management system of claim 1, wherein the plural control elements include plural adjustable openings configured to change between plural positions to control the amount of the ambient air that is directed through the second conduit, the plural positions including one or more open positions, a fully opened position, and a fully closed position.

3. The thermal management system of claim 2, wherein the plural adjustable openings in one or more open positions or the fully opened position are configured to increase the amount of the ambient air that is directed through the second conduit relative to the plural adjustable openings in the closed position.

4. The thermal management system of claim 2, wherein the one or more processors are configured to control a first adjustable opening of the plural adjustable openings to a first position of the plural positions, and the one or more processors are configured to control a second adjustable opening of the plural adjustable openings to a second position of the plural positions based on the temperature differential between the temperature of the ambient air and the temperature of the first fluid.

5. The thermal management system of claim 1, wherein the plural control elements includes a blower and one or more adjustable openings that are disposed upstream of the first conduit and are configured to control the amount of the ambient air that is directed into the second conduit.

6. The thermal management system of claim 1, wherein the vehicle system is configured to move to a first geographic location, the one or more processors configured to determine the temperature of the ambient air at the first geographic location, wherein the one or more processors are configured to control operation of the control assembly to operate according to the first setting to control the amount of the ambient air that is directed through the second conduit based at least in part on the temperature differential between the temperature of the ambient air at the first geographic location and the temperature of the first fluid exceeding the predetermined threshold.

7. The thermal management system of claim 1, wherein the vehicle system is configured to move to a second geographic location, the one or more processors configured to determine the temperature of the ambient air at the second geographic location, wherein the one or more processors are configured control operation of the control assembly to operate according to the second setting to control the amount of the ambient air that is directed through the second conduit based at least in part on the temperature differential between the temperature of the ambient air at the second geographic location and the temperature of the first fluid being less than the predetermined threshold.

8. The thermal management system of claim 1, further comprising a sensor system operably coupled with the one or more processors, wherein the sensor system comprises one or more sensors configured to measure the temperature of the ambient air and the temperature of the first fluid.

9. The thermal management system of claim 1, wherein the wherein the plural geographic locations include plural different environmental parameters, wherein the one or more processors are configured to control operation of the control assembly based on the plural different environmental parameters.

10. A system comprising:
a conduit assembly configured to be operably coupled with a vehicle system that is configured to move between plural geographic locations have different temperatures of ambient air, the conduit assembly comprising a first conduit and a second conduit fluidly separate from the first conduit, the first conduit configured to be fluidly coupled with and extend between a first stage compressor as a source of a first fluid and a second stage compressor as a destination for the first fluid, the second conduit configured to be fluidly coupled with an area outside of the vehicle system via plural inlets configured to direct ambient air into the second conduit, the ambient air configured to exchange thermal energy with the first fluid;
a control assembly comprising plural adjustable openings operable coupled with an exterior surface of the vehicle system, wherein the plural adjustable openings are configured to change between plural positions to control an amount of the ambient air that is directed into the second conduit from the area outside of the vehicle system; and
one or more processors configured to control operation of the control assembly based on one or more of a temperature of the ambient temperature of an ambient humidity of an environment in which the vehicle system is disposed,
where the vehicle system is configured to move between a first geographic location and a second geographic location, wherein the one or more processors are configured to change the operation of the control assembly based on the vehicle system moving from the first geographic location to the second geographic location, and one or more of the ambient temperature or the ambient humidity of the environment changing responsive to the vehicle system moving from the first geographic location to the second geographic location.

11. The system of claim 10, wherein the one or more processors are configured to determine a temperature differential between the ambient temperature and a temperature of the first fluid, wherein the one or more processors are configured to control operation of the control assembly based on the temperature differential exceeding a predetermined threshold.

12. The system of claim 10, wherein the one or more processors are configured to determine a temperature differential between the ambient temperature and a temperature of the first fluid, wherein the one or more processors are configured to control operation of the control assembly based on the temperature differential being less than a predetermined threshold.

13. The system of claim 10, further comprising a sensor system operably coupled with the one or more processors, wherein the sensor system includes one or more sensors configured to measure the ambient temperature of the ambient air and a temperature of the first fluid, wherein the one or more processors are configured to determine a temperature differential between the temperature of the first fluid and the ambient temperature of the ambient air, wherein the one or more processors are configured to control operation of the control assembly based at least in part on the temperature differential.

14. A method comprising:
determining a temperature differential between an ambient temperature of ambient air of an environment in which a conduit assembly of a vehicle system is disposed and a temperature of a first fluid moving within a first conduit of the conduit assembly, the conduit assembly comprising the first conduit and a second conduit that is fluidly separate from the first conduit, the first conduit configured to be fluidly coupled with and extend between a first stage compressor as a source of a first fluid and a second stage compressor as a destination for the first fluid, the second conduit fluidly coupled with an area outside of the vehicle system via one or more inlets, wherein the inlets are configured to direct the ambient air into the second conduit to exchange thermal energy with the first fluid within the conduit assembly; and
controlling operation of plural adjustable openings of a control assembly to control an amount of the ambient air to be directed through the one or more inlets of the second conduit and into the second conduit, the plural adjustable openings operably coupled with an exterior surface of the vehicle system, the control assembly configured to operate according to a first operational setting or a second operational setting based on the temperature differential between the tempertrue of the ambient air and the temperature of the first fluid, wherein the control assembly is configured to operate according to the first operational setting responsive to determining that the temperature differential exceeds a predetermined threshold, and the control assembly is configured to operate according to the second operational setting responsive to determining that the temperature differential is less than the predetermined threshold, wherein a first amount of the ambient air that is configured to be directed through the second conduit while the control assembly is operated according to the first operational setting is different than a second amount of the ambient air that is configured to be directed through the second conduit while the control assembly is operating according to the second operational setting.

15. The method of claim 14, wherein controlling operation of the control assembly to operate according to the first operational setting or the second operational setting includes changing a position of one or more of the plural adjustable openings of the control assembly, the plural adjustable openings being disposed at a location that is upstream of the first conduit, the plural adjustable openings configured to control the amount of the second fluid that is directed into the second conduit of the conduit assembly.

16. The method of claim 14, wherein the vehicle system is configured to move from a first geographic location to a second geographic location, and further comprising:
   determining a new temperature differential between a new ambient temperature of the ambient air at the second geographic location and the temperature of the first fluid; and
   changing operation of the control assembly based on the new temperature differential between the new ambient temperature and the temperature of the first fluid.

17. The method of claim 14, further comprising controlling operation of the control assembly to change the amount of the second fluid that is directed through the second conduit based on the ambient temperature of the ambient air being greater than a determined ambient threshold.

18. The method of claim 14, further comprising controlling operation of the control assembly to change the amount of the second fluid that is directed through the second conduit based on the ambient temperature of the ambient air boing less than a determined ambient threshold.

* * * * *